United States Patent Office 3,309,419
Patented Mar. 14, 1967

3,309,419
PARAFFINIC HYDROCARBON DEHYDROGENATION PROCESS
Robert B. Regier, Bartlesville, Okla., assignor to Phillips Petroleum Company, a corporation of Delaware
No Drawing. Filed Feb. 17, 1964, Ser. No. 345,090
11 Claims. (Cl. 260—683.3)

This invention relates to a process for the dehydrogenation of paraffinic hydrocarbons. In another aspect, this invention relates to a process for the oxidative dehydrogenation of a paraffinic hydrocarbon in the presence of a molten salt medium.

Oxidative dehydrogenation is an attractive route for the production of olefins from paraffinic hydrocarbons. The oxygen by combining with the hydrogen to form water has a favorable effect upon the equilibrium of the reaction mixture. However, conventionally required high temperature reactions involving hydrocarbon and air or oxygen present control problems. It is not always possible to accurately control the reaction and to minimize losses of the feed stock which goes to oxides of carbon or other undesirable by-products as a result of localized overheating.

Accordingly, an object of my inventios is to provide a process for the production of olefins from paraffinic hydrocarbons.

Another object of my invention is to provide a low temperature process for the oxidative dehydrogenation of paraffinic hydrocarbons to produce olefins.

Other objects, advantages and features of my invention will be readily apparent to those skilled in the art from the following description and appended claims.

I have by my invention provided a process for the production of olefins from paraffinic hydrocarbons wherein a paraffinic hydrocarbon feed is contacted with a molten inorganic salt medium in the presence of oxygen at a temperature in the range of 300–550° C.

The paraffinic feed hydrocarbons which are applicable to the process of my invention are those paraffinic hydrocarbons having at least 4 carbon atoms per molecule and preferably having from 4 to 10 carbon atoms per molecule. These paraffinic hydrocarbons can be unbranched, branched, cyclic, acyclic, or combinations thereof. Suitable paraffinic hydrocarbon feed materials include butane, isobutane, isopentane, cyclohexane, methylcyclohexane, 2,4-dimethylcyclohexane, decane, and the like.

The molten salt medium employed in the process of my invention comprises a molten salt medium selected from the group consisting of (1) silver chloride, (2) a mixture of potassium chloride and silver chloride, (3) a mixture of potassium chloride and lithium chloride, (4) at least one alkali metal nitrate, and (5) mixtures of at least two of (1), (2), (3) and (4). The inorganic salt medium employed in the oxidative dehydrogenation process is molten at the reaction temperature. Silver chloride is molten at a temperature of about 450° C. With potassium chloride-silver chloride mixtures, liquid mixtures occur above 306° C. in the range of 0 to 50 mol percent potassium chloride (a eutectic mixture appears at about 31 mol percent potassium chloride, which melts at about 306° C.).

With potassium chloride-lithium chloride salt mixtures, completely liquid or molten mixtures occur above 352° C. in the range of 22–55 mol percent potassium chloride (a eutectic mixture appears at 41 mol percent potassium chloride melting at 352° C.). Although not preferred, it is within the scope of this invention to employ salt mixture compositions wherein all of the salt mixture is not completely molten at the reaction temperature (300–550° C.). The molten salt mixture can thus contain a minor quantity of solid phase salt.

The inorganic salt medium employed in the process of my invention can comprise an alkali metal nitrate salt, alone or in combination with another alkali metal nitrate salt. Thus, lithium nitrate, sodium nitrate, potassium nitrate, rubidium nitrate, and cesium nitrate are applicable. Of these salts, sodium or potassium nitrate are more suitable due to their relatively high stability, potassium nitrate having been shown to be of particular value. As previously noted, it is within the scope of this invention to employ a molten salt medium comprising an alkali metal nitrate in admixture with potassium chloride and lithium chloride or silver chloride.

The oxidative dehydrogenation reaction is conducted at a temperature in the range of 300–550° C. When employing a potassium chloride-lithium chloride or a potassium chloride-silver chloride molten mixture, eutectic compositions of the salts are preferred with a reaction temperature in the range of 375–425° C. The pressure under which the oxidative dehydrogenation process can be conducted can vary over a wide range, but will normally be in the range of 0–750 p.s.i.g.

The oxidative dehydrogenation reaction is conducted in the presence of air or other oxygen-containing gas. The ratio of paraffinic hydrocarbon feed to air or oxygen which is applicable to the present invention can vary widely but preferably excludes the explosive mixture range for the particular paraffinic hydrocarbon feed material. It is preferred to operate on the fuel-rich side of the explosive mixture range. For example, the explosive limits for butane in air are about 1.6–8.5 mol percent butane. Hence, a preferred ratio of butane to oxygen is 0.5–10 mols of butane per mol of oxygen (a 2:1 mol ratio is theoretically required to convert butane to 1-butene and water). Still higher mol ratios of butane to oxygen are operable, but result necessarily in lower conversions. It has been discovered that lower butane-oxygen ratios (greater quantities of air) up to the explosive limit range, as previously indicated, offer greater conversion to olefin with little or no loss of selectivity. In operation, the molecular oxygen is normally completely converted and does not appear in the effluent.

Preferably, the paraffinic hydrocarbon feed is blended by conventional means with the required amount of oxygen-containing gas and the mixture preheated until it is at or near the reaction temperature. This homogeneous mixture is then contacted within the reaction zone with the previously described molten salt medium. It is also within the scope of this invention to introduce the oxygen-containing gas and paraffinic hydrocarbon feed independently into the oxidative dehydrogenation zone.

Although not to be limited thereto, the oxidative dehydrogenation reaction is preferably conducted continuously. The reaction mixture comprising paraffinic hydrocarbon feed and oxygen-containing gas is contacted with the molten salt medium in the reaction zone such that a residence time in the reaction zone is normally about 0.5–30 seconds, preferably 1–15 seconds.

Although not to be limited thereto, the suggested method for effecting the oxidative dehydrogenation reaction comprises introducing the vaporous paraffinic hydrocarbon and oxygen-containing gas mixture to the bottom of a vertical column containing a molten salt medium. The vaporous feed is permitted to travel upwardly through the column in the form of fine bubbles. The effluent gases leaving the top of the column containing the oxidative dehydrogenated product, water vapor, some oxides of carbon, an unconverted feed material, can then be separated by conventional means. The olefin products are recovered and unconverted paraffinic hydrocarbons can be recycled to the dehydrogenation zone.

The following examples are presented as illustrative of the objects and advantages of my invention. However, it is not intended that the invention should be limited to the specific embodiments illustrated therein.

EXAMPLE I

In this example, butane was oxidatively dehydrogenated in the presence of a molten potassium chloride-silver chloride mixture. A 22 mm. ID glass tube, closed at one end, was loaded with sufficient potassium chloride-silver chloride eutectic (31 mol percent of potassium chloride) to prepare a 9-inch column. This glass reactor was encased in a graphite tube which was in contact with an external heater. The salt mixture was heated to 350° C. A metered blend of butane and air, with a butane to oxygen mol ratio of 1.62, was passed into the molten salt mixture by means of a glass dip tube which extended to the bottom of the salt-filled reaction tube. Through small holes located at the lower end of this dip tube, the gas was permitted to escape from the tube and to bubble upwards through the molten salt column and out through the top of the reaction tube under atmospheric pressure. The exit gas was passed through a condenser, cooled to the ice point and then was periodically sampled for analysis. The residence time of the reaction mixture in the fused salt medium was estimated at 1.5 seconds. This reaction was conducted at several operating temperatures and the results are recorded in Table I below, in which the effluent gas analysis is given in mols per 100 mols butane feed.

TABLE I

| Temp., °C | 350 | 375 | 400 | 425 | 450 | 475 |
|---|---|---|---|---|---|---|
| Methane | 0.1 | 0.12 | 0.9 | 0.13 | 0.1 | 0.1 |
| Carbon monoxide | 0.19 | 6.3 | 16.4 | 4.9 | 2.9 | 2.4 |
| Carbon dioxide | 1.18 | 2.4 | 3.5 | 4.0 | 5.2 | 7.7 |
| Ethanes and ethylene | 0.1 | 0.8 | 2.4 | 0.8 | 0.4 | 0.4 |
| Propylene | 0.1 | 0.5 | 1.2 | 0.5 | 0.3 | 0.3 |
| Normal butane | 99.6 | 91.6 | 81.6 | 91.8 | 93.9 | 94.5 |
| Butene | 0.1 | 5.5 | 11.0 | 5.25 | 3.6 | 2.59 |
| Conversion, percent | 0.4 | 8.4 | 18.4 | 8.2 | 6.1 | 5.5 |
| Selectivity to butenes, percent | 25 | 65 | 60 | 64 | 59 | 47 |

The above data illustrate that butane is effectively dehydrogenated with percent converted reaching a peak at about 400° C.

EXAMPLE II

In this example, butane dehydrogenation runs were conducted according to the process of Example I with the exception that a lithium chloride-potassium chloride eutectic (41 mol percent potassium chloride) was employed in the reaction tube. The butane to oxygen mol ratio for each run was 1.48. The results of operating at several temperatures is illustrated below in Table II:

TABLE II

| Temp., °C | 400 | 450 | 500 |
|---|---|---|---|
| Methane | 0.5 | 0.12 | 0.23 |
| Carbon monoxide | 13.5 | 6.7 | 4.6 |
| Carbon dioxide | 6.6 | 8.8 | 11.6 |
| Ethanes and ethylene | 1.7 | 0.76 | 0.50 |
| Propylene | 0.71 | 0.56 | 0.46 |
| Normal butane | 85.6 | 89.5 | 90.2 |
| Butenes and butadiene | 7.8 | 5.7 | 4.0 |
| Conversion, percent | 14.4 | 10.5 | 9.8 |
| Selectivity to butenes and butadiene, percent | 54 | 54 | 41 |

The above data show that a potassium lithium chloride-potassium chloride melt mixture is also effective in the oxidative dehydrogenation of butane.

EXAMPLE III

In this example, runs were conducted using a potassium chloride-lithium chloride melt system for the dehydrogenation of butane, substantially decreasing the quantity of oxygen employed in the reaction. The butane to oxygen mol ratio in this series of runs was 3.64. The results of these runs are illustrated below in Table III.

TABLE III

| Temp., °C | 450 | 500 | 550 |
|---|---|---|---|
| Methane | 0.14 | 0.40 | 3.3 |
| Carbon monoxide | 2.6 | 2.3 | 3.0 |
| Carbon dioxide | 2.4 | 2.4 | 3.6 |
| Ethane and ethylene | 0.45 | 0.62 | 3.05 |
| Propylene | 0.35 | 0.55 | 2.56 |
| Normal butane | 94.6 | 94.5 | 88.5 |
| Butenes and butadiene | 3.54 | 3.55 | 5.4 |
| Conversion, percent | 5.4 | 5.5 | 11.5 |
| Selectivity to butenes and butadiene, percent | 66 | 65 | 47 |

The above data illustrate that the inventive process is operable when employing lower concentrations of oxygen in the feed to the reaction zone.

EXAMPLE IV

In this example, butane was dehydrogenated employing potassium nitrate as the molten salt medium. The apparatus and procedure employed in this example were the same as those employed in the previous examples. The salt was heated to 350° C. A metered blend of butane and air, with a butane to oxygen mol ratio of 1.5, was passed into the molten salt. The residence time in the reaction zone was estimated at 1.0–1.5 seconds. The reaction was conducted at several temperatures, and the results are recorded below in Table IV.

TABLE IV

| Temperature, °C | 350 | 380 | 410 | 440 | 470 | 500 | 530 |
|---|---|---|---|---|---|---|---|
| Butane converted, percent | 0 | 14.6 | 6.6 | 7.5 | 7.4 | 7.6 | 7.1 |
| Selectivity to butenes, percent | | 54 | 62 | 68 | 68 | 68 | 69 |

The above data illustrate that the inventive process is operable to temperatures up to at least 530° C.

EXAMPLE V

In this example, butane dehydrogenation runs were conducted according to the process of Example IV with the exception that pure oxygen was employed in place of air. The butane to oxygen ratio was 1.9. The results of the runs are illustrated below in Table V.

TABLE V

| Temperature, °C | 360 | 380 | 400 | 420 |
|---|---|---|---|---|
| Butane converted, percent | 4.2 | 19.6 | 19.8 | 19.1 |
| Selectivity to butenes, percent | 48 | 49 | 51 | 55 |

The above data illustrate that the inventive process is operable with undiluted oxygen.

EXAMPLE VI

In this example, isopentane was dehydrogenated according to the process of Example IV. The isopentane feed was saturated with air so that the isopentane to oxygen mol ratio was 2.34. The results of several runs conducted at various temperatures are illustrated below in Table VI:

TABLE VI

| Temp., °C | 360 | 390 | 420 | 450 | 480 |
|---|---|---|---|---|---|
| Isopentane converted, percent | 0.4 | 3.7 | 5.0 | 4.3 | 4.5 |
| Pentene product, mols/100 mols isopentane | 0.36 | 2.42 | 3.13 | 2.73 | 3.02 |
| Isoprene, mols/100 mols isopentane | | 0.30 | 0.44 | 0.55 | 0.51 |
| Selectivity to pentenes and isoprene, percent | 90 | 74 | 71 | 76 | 78 |

The above data illustrate that the high conversion of isopentane to the desired products was conducted with high selectivity. The products included all three isomeric pentenes.

As will be evident to those skilled in the art, various modifications of this invention can be made, or followed, in the light of the foregoing disclosure, without departing from the spirit or scope thereof.

I claim:

1. A process which comprises bubbling a mixture consisting of an oxygen-containing gas and a paraffinic hydrocarbon having at least 4 carbon atoms per molecule through a medium consisting of a completely molten salt in a dehydrogenation zone, said molten salt medium selected from the group consisting of (1) silver chloride, (2) a mixture of potassium chloride and silver chloride, (3) a mixture of potassium chloride and lithium chloride, (4) at least one alkali metal nitrate, and (5) mixtures of at least two of (1), (2), (3) and (4), and maintaining the temperature in said dehydrogenation zone in the range of 300–550° C.

2. A process which comprises bubbling a mixture consisting of an oxygen-containing gas and a $C_4$–$C_{10}$ paraffinic hydrocarbon through a medium consisting of a completely molten salt in a dehydrogenation zone, said molten salt medium consisting of a mixture of potassium chloride and silver chloride, and maintaining the temperature in said dehydrogenation zone in the range of 300–550° C.

3. The process of claim 2 wherein said molten salt medium mixture is a eutectic mixture and the temperature of the dehydrogenation zone is maintained in the range of 375–425° C.

4. The process of claim 3 wherein said paraffinic hydrocarbon is butane.

5. A process which comprises bubbling a mixture consisting of an oxygen-containing gas and a $C_4$–$C_{10}$ paraffinic hydrocarbon through a medium consisting of a completely molten salt in a dehydrogenation zone, said molten salt medium consisting of a mixture of potassium chloride and lithium chloride, and maintaining the temperature of said dehydrogenation zone in the range of 300–550° C.

6. The process of claim 5 wherein said molten salt medium mixture is a eutectic mixture and the temperature of the dehydrogenation zone is maintained in the range of 375–425° C.

7. The process of claim 6 wherein said paraffinic hydrocarbon is butane.

8. A process which comprises bubbling a mixture of an oxygen-containing gas and a $C_4$–$C_{10}$ paraffinic hydrocarbon through a medium consisting of a completely molten salt in a dehydrogenation zone, said molten salt medium consisting of at least one alkali metal nitrate, and maintaining the temperature of said dehydrogenation zone in the range of 300–550° C.

9. The process of claim 8 wherein said molten salt medium is potassium nitrate.

10. The process of claim 9 wherein said paraffinic hydrocarbon is butane.

11. The process of claim 9 wherein said paraffinic hydrocarbon comprises isopentane.

References Cited by the Examiner
UNITED STATES PATENTS

| | | | |
|---|---|---|---|
| 3,080,435 | 3/1963 | Nager | 260—680 |
| 3,205,280 | 9/1965 | Wattimena et al. | 260—680 |
| 3,207,805 | 9/1965 | Gay | 260—680 |
| 3,207,806 | 9/1965 | Bajars | 260—680 |

OTHER REFERENCES

Mellor's Modern Inorganic Chemistry; 1951 Longmans, Green and Co., New York, page 540.

DELBERT E. GANTZ, *Primary Examiner.*

S. P. JONES, *Assistant Examiner.*